March 13, 1934. F. T. HARRINGTON Re. 19,111
TOOL HOLDER
Original Filed Feb. 16, 1931
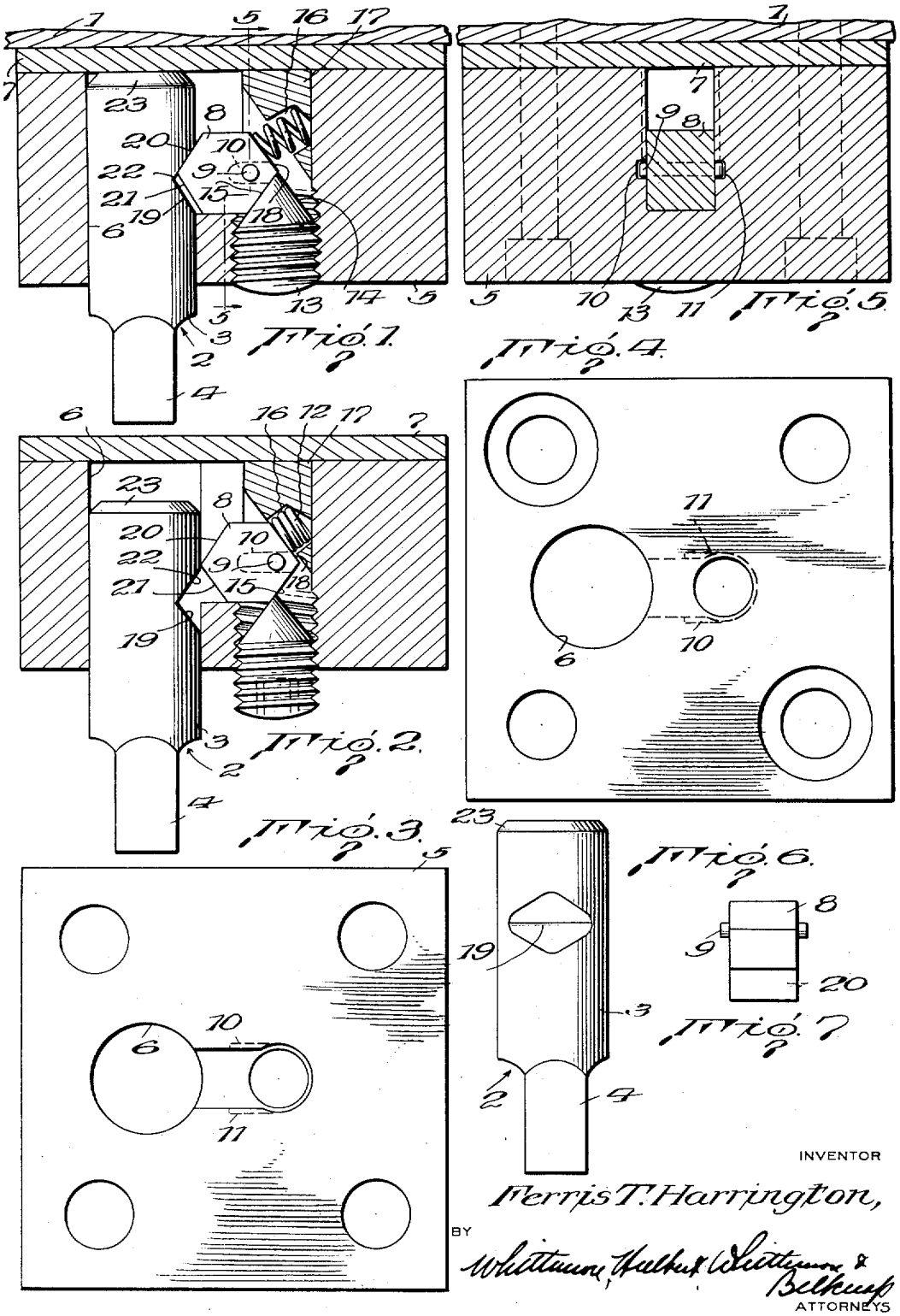
INVENTOR
Merris T. Harrington,
BY
Whittemore, Hulbert & Belknap
ATTORNEYS Reissued Mar. 13, 1934 Re. 19,111

UNITED STATES PATENT OFFICE 19,111

TOOL HOLDER

Ferris T. Harrington, Detroit, Mich., assignor to Whitman & Barnes, Incorporated, Detroit, Mich., a corporation of Michigan Original No. 1,862,623, dated June 14, 1932, Serial No. 516,192, February 16, 1931. Application for reissue December 20, 1933, Serial No. 703,319

19 Claims. (Cl. 279—79)

This invention relates generally to tool holders, especially punch and die retainers, and consists of certain novel features of the construction, combinations and arrangements of parts, that will be hereinafter more fully described and particularly pointed out in the appended claims.

One of the essential objects of the invention is to provide a tool holder wherein means is provided for effectively urging and holding a shank of a tool such as a punch against a suitable seat or backing plate.

Another object is to provide a tool holder wherein the means just mentioned includes a plunger that is mounted for longitudinal movement only within the body of the retainer and that is actuable by a spring and a manually operable element.

Another object is to provide a tool holder wherein the plunger referred to is elongated in form and is provided at its forward end with a cam face for engagement with the tool shank.

Another object is to provide a tool holder wherein a portion of the rear end of the plunger referred to is flat and inclined relative to the axis of the bore in the retainer body that receives the tool shank and is engageable by an inclined surface of the manually operable element aforesaid.

Another object is to provide a tool holder wherein means is provided in the retainer body for guiding the plunger into and out of projected position in the bore.

Another object is to provide a tool holder wherein the plunger is limited in its movement into the bore when the latter is free of a tool shank.

Another object is to provide a tool holder wherein the plunger may be actuated by the spring without moving or disturbing the manually operable element.

Another object is to provide a tool holder wherein the plunger aforesaid is so constructed and arranged that it may be readily retracted upon insertion of a tool shank into the bore.

Another object is to provide a tool holder wherein the plunger is so constructed and arranged that the tool shank may be readily withdrawn from the bore by hand when the plunger is free of the manually operable element.

Other objects, advantages and novel details of construction of this invention will be made more apparent as this description proceeds, especially when considered in connection with the accompanying drawing.

In the accompanying drawing:

Figure 1 is a vertical sectional view through a retainer and hardened backing plate assembly embodying my invention and showing the same applied to the base casting of a punch press;

Figure 2 is a view similar to Figure 1 after the punch has been lowered in the retainer;

Figure 3 is a top plan view of the retainer;

Figure 4 is a bottom plan view of the retainer;

Figure 5 is a sectional view taken on the line 5—5 of Figure 1;

Figure 6 is a detail view of the punch;

Figure 7 is a detail view of the plunger.

Referring now to the drawing, 1 is a base casting of a punch press; 2 is a punch having a shank 3 and a work engaging head 4; 5 is a punch retainer bolted to the casting 1 and having a vertical bore 6 receiving the shank 3 of the punch; 7 is a hardened backing plate for the punch shank closing the upper end of the bore 6 and constituting a seat for the upper end of the tool shank 3; 8 is a plunger movable transversely of the retainer 5 to hold the shank 3 in the bore 6; 9 is a guide pin extending through the plunger 8 and engaging aligned horizontal grooves 10 and 11 respectively in the retainer 5; 12 is a coil spring maintaining the plunger 8 in projected position to engage the shank 3, and 13 is a screw adjustable in the retainer to maintain the plunger 8 in firm engagement with the punch shank 3. As shown, the plunger 8 is hexagonal in shape and is mounted for longitudinal movement in a plane at right angles to the punch shank. Preferably the screw 13 is adjustable in a plane parallel to the bolt 6 receiving the punch shank and has a tapered upper end 14 that engages the innermost lower inclined side 15 of the plunger 8 while the spring 12 is received in a socket 16 in a plug 17 having a press fit within the retainer and engages the innermost upper inclined side 18 of the plunger. The shank 3 of the punch has a V-shaped recess 19 that receives the outermost upper and lower inclined sides 20 and 21 respectively of the plunger, and the arrangement is such that the pressure exerted by the bevelled end 14 by the screw against the inclined side 15 of the plunger is transmitted to the inclined wall 22 of the recess 19 in the punch shank so that the upper end 23 of the punch shank is cammed firmly against the backing plate 7. In other words, the adjustment of the screw 13 not only actuates the plunger 8 transversely of the retainer into the recess 19 in the punch shank so that the punch will be held against withdrawal from the bore 6 but in addition moves the punch bodily upwardly against the backing plate so that all play or lost motion between the parts is effectively taken up and a firm connection is established.

When the screw 13 is loosened the punch 4 may be withdrawn from the bore 6 as a pull on the punch will cause the inclined wall 22 of the recess 19 to cam the plunger 8 back against the tension of the spring 12. However, as soon as the punch is withdrawn the spring 12 will again force the plunger 8 forwardly so that the forward end thereof projects into the bore. Consequently when the same or another punch is inserted into the bore 6 the plunger 8 will snap into the recess 19 and will hold the punch in the retainer. Inasmuch as the inclined side 20 of the plunger 8 faces upwardly toward the backing plate 7 and is engageable with a correspondingly inclined wall 22 of the punch shank 3, it will be readily apparent that the upper end 23 of the punch shank will not only be urged upwardly toward but will be effectively held by the spring 12 against the backing plate 7 constituting the seat for the punch shank. The screw 13 may then be tightened to establish the firm connection above referred to. Inasmuch as the guide pin 9 is carried by the plunger 8 and engages the grooves 10 and 11, it is apparent that the plunger will be guided in its longitudinal movement into and out of the bore 6 in the retainer body 5. Engagement of said pin 9 with the forward ends of the grooves 10 and 11 will effectively limit movement of the plunger 8 into the bore 6.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a tool holder, a body having a bore for receiving the shank of a tool, a seat for the shank at one end of the bore, and means for pressing the shank against said seat including a plunger movable longitudinally in the body and having a cam surface at its outer end engageable with the shank, a spring constantly bearing against the plunger to maintain it in projected position, and an adjustable element in the body and engageable with the plunger.

2. In a tool holder, a body having a bore for receiving the shank of a tool, a seat for the shank at one end of the bore, a longitudinally movable plunger in the body having a cam face for engaging and urging a tool shank against said seat and having two inclined faces at its inner end, a coil spring constantly abutting one of said inclined faces, and a manually operable member in the body movable to and from the other of said inclined faces.

3. In a tool holder, a body having a bore for receiving the shank of a tool, a seat for the shank at one end of the bore, a plunger movable transversely of the body into the bore and having means for engaging and urging a tool shank against said seat, means within the body for limiting the movement of the plunger into the bore, and means always in engagement with the plunger and constantly urging the same toward said limiting means.

4. In a tool holder, a body having a bore for receiving the shank of a tool and having substantially aligned guide grooves adjacent said bore, a seat for the shank at one end of the bore, and means for urging the shank against said seat, including a longitudinally movable plunger having a cam face for engagement with a tool shank, means for moving said plunger, and a pin extending through said plunger and having opposite ends thereof received within the guide grooves aforesaid.

5. In a tool holder, a body having a bore for receiving the shank of a tool and having substantially aligned guide grooves extending at substantially right angles to said bore with the outer ends thereof adjacent said bore, a seat for the shank at one end of the bore, means for urging the shank against said seat including a slidable member having a cam face for engagement with the tool shank, means for moving said slidable member, and means for limiting the outward movement of said plunger including a pin carried by the plunger and having portions within said guide grooves and engageable with the outer ends thereof.

6. In a tool holder, a body having a bore for receiving the shank of a tool, a seat for the shank at one end of the bore, a plunger movable in the body transversely of the bore, and means for moving a tool shank in the bore against said seat including yieldable means constantly bearing against the plunger, and a screw threadedly engaging the body and engageable with the plunger.

7. In a tool holder, a body having a bore for receiving the shank of a tool, a seat for the shank at one end of the bore and means for urging the shank longitudinally of the bore toward and for holding said shank against said seat, including a screw threadedly engaging the body, a spring within the body adjacent but out of contant with the screw, and a member movable by said spring while the screw is stationary, and being also movable by said screw.

8. In a tool holder, a body having a bore for receiving the shank of a tool, a seat for the shank at one end of the bore and means for urging the shank longitudinally of the bore toward and for holding the shank against said seat, including a manually operable member in the body, a plunger actuable by said manually operable member, and means operable automatically to move the plunger away from said manually operable member.

9. In a tool holder, a body having a bore for receiving the shank of a tool, a seat for the shank at one end of the bore and means for urging the shank longitudinally of the bore toward and for holding the shank against said seat, including a manually operable member in the body, a member movable by the manually operable member into the bore, and yieldable means operable while the manually operable means is stationary for moving the last mentioned member.

10. In a tool holder, a body having a bore for receiving the shank of a tool, a seat for the shank at one end of the bore, and means for urging the shank longitudinally of the bore toward and for holding the shank against said seat, including a yieldable element and a manually operable element, and a member operable by one of said elements without causing the other to move.

11. In a tool holder, a body having a bore for receiving the shank of a tool, a seat for the shank at one end of the bore and means for urging the shank longitudinally of the bore toward and for holding the shank against said seat, including a yieldable element and a manually operable element, and a member operable by either of said elements to engage the shank, one of said elements being operable to move the member without moving the other element.

12. In a tool holder, a body having a bore for receiving the shank of a tool, a seat for the shank at one end of the bore, and means for pressing the shank against said seat including a plunger movable longitudinally in the body and having a cam surface at its outer end engageable with the shank, a portion of the rear end of said plunger being flat and inclined relative to the axis of the bore, and actuating means for said plunger including a manually operable member in the body having an inclined surface engageable directly with and slidable lengthwise of the flat portion of the rear end of the plunger.

13. In a tool holder, a body having a bore for receiving the shank of a tool, a seat for the shank at one end of the bore, a plunger movable transversely of the body into the bore and having means for engaging and urging a tool shank against said seat, said plunger being guided in its movement into and out of the bore and being limited in its movement into the bore when the tool shank is removed from the bore, and means always in engagement with the plunger and constantly urging the same into the bore.

14. In a tool holder, a body having a bore for receiving the shank of a tool, a seat for the shank at the upper end of the bore, and means for urging the shank longitudinally of the bore toward and for holding said shank against said seat, including a reciprocating member movable into the bore and having a camming surface facing the upper end of the bore and engageable with the shank, and means associated with the body for limiting the movement of the member into the bore.

15. In a tool holder, a body having a bore for receiving the shank of a tool and having a slideway disposed substantially at right angles to and opening into the bore at one side thereof, a seat for the shank at one end of the bore, and means for pressing the shank against said seat including a plunger slidable in the slideway of the body and having a cam surface at its forward end engageable with the shank, a portion of the rear end of said plunger being flat and inclined relative to the axis of the bore, and means within the body and engageable with the flat portion of the rear end of said plunger for urging the latter forwardly on the slideway to operative tool shank engaging position, said plunger having means engageable with the body upon forward movement of the plunger to limit movement thereof on the slideway.

16. In a tool holder, a body having a bore for receiving the shank of a tool, a seat for the shank at one end of the bore, means for urging the shank longitudinally of the bore toward and for holding the shank against said seat, including a yieldable element, a manually operable element, and a slidable member operable by said elements, a portion of said member being movable into the bore and having a cam face engageable with the tool shank, said member having means at opposite sides thereof engageable with the body to limit movement of the portion aforesaid into the bore.

17. In a tool holder, a body having a bore for receiving the shank of a tool, a seat for the shank at one end of said bore, a plunger movable in the body in a direction substantially at right angles to the bore and having a portion at its forward end operable upon forward movement of the plunger to move the tool shank longitudinally of the bore toward and to hold the tool shank against said seat, means being provided in the body for limiting the forward movement of the plunger into the bore upon removal of the tool, and actuating means for the plunger including means constantly engaging and urging the plunger toward said limiting means.

18. In a tool holder, a body having a bore for receiving the shank of a tool, and a slideway disposed at substantially right angles to and opening into said bore at one side thereof, a seat for the shank at one end of said bore, a member slidably engaging the slideway and having a portion movable into said bore and provided with means for urging the shank longitudinally of the bore toward and for holding the shank against said seat, means being provided in the body for limiting movement of the portion just mentioned into said bore when the tool is removed, said member being provided in rear of the portion aforesaid with a cam face, and actuating means for said member including a manually operable element movable in a direction substantially at right angles to the slideway and having a cam face slidably engaging the cam face aforesaid.

19. In combination, a tool and a retainer therefor, the shank of said tool having a laterally opening notch in one side thereof, said retainer including a body having a bore for receiving the shank of said tool, a seat for the shank at one end of said bore, a plunger movable in the body in a direction substantially at right angles to the bore and having a portion at its forward end operable upon forward movement of the plunger to engage the walls of said notch, clearance being provided between the plunger and the bottom wall of said notch when the shank is seated, whereby the shank is held against said seat, and actuating means for the plunger, including means constantly engaging the plunger.

FERRIS T. HARRINGTON.